United States Patent [19]

Hoots et al.

[11] Patent Number: 4,963,267

[45] Date of Patent: Oct. 16, 1990

[54] STABILIZATION OF MANGANESE IN AQUEOUS SYSTEMS

[75] Inventors: John E. Hoots, St. Charles; Kenneth P. Fivizzani, Naperville; Barbara E. Fair, Downers Grove, all of Ill.

[73] Assignee: Nalco Chemical Company, Naperville, Ill.

[21] Appl. No.: 501,438

[22] Filed: Mar. 26, 1990

Related U.S. Application Data

[63] Continuation of Ser. No. 256,555, Oct. 12, 1980, abandoned.

[51] Int. Cl.$^5$ .................................................. C02F 5/12
[52] U.S. Cl. ........................................ 210/701; 252/180
[58] Field of Search .............................. 210/698–701; 252/180, 181

[56] References Cited

U.S. PATENT DOCUMENTS

| | | | |
|---|---|---|---|
| 3,709,815 | 1/1973 | Boothe et al. | 210/58 |
| 3,709,816 | 1/1973 | Walker et al. | 210/58 |
| 3,790,610 | 2/1974 | Lum et al. | 252/180 |
| 3,928,196 | 12/1975 | Persinski et al. | 210/58 |
| 4,283,300 | 8/1981 | Kurtz | 252/95 |
| 4,302,350 | 11/1981 | Callicott | 252/174.23 |
| 4,428,872 | 1/1984 | Callicott | 252/550 |
| 4,536,292 | 8/1985 | Matz | 210/701 |
| 4,552,665 | 11/1985 | Ralston et al. | 210/697 |
| 4,552,665 | 11/1985 | Ralston et al. | 210/697 |
| 4,584,105 | 4/1986 | Fong | 210/701 |
| 4,604,431 | 8/1986 | Fong et al. | 525/351 |
| 4,640,793 | 2/1987 | Persinski et al. | 252/180 |
| 4,676,911 | 6/1987 | Fong | 210/701 |
| 4,703,092 | 10/1987 | Fong | 525/351 |
| 4,711,725 | 12/1987 | Amick et al. | 252/180 |
| 4,752,443 | 6/1988 | Hoots et al. | 210/697 |
| 4,756,881 | 7/1988 | Hoots et al. | 252/180 |
| 4,801,388 | 1/1989 | Fong et al. | 210/701 |
| 4,869,828 | 9/1989 | Hoots et al. | 210/701 |

FOREIGN PATENT DOCUMENTS 187489  5/1985  Japan.
187491  5/1985  Japan.

Primary Examiner—Peter Hruskoci
Attorney, Agent, or Firm—Joan I. Norek; Robert A. Miller; Donald G. Epple

[57] ABSTRACT

The precipitate species of manganese in the presence of an oxidative condition in the waters of an aqueous system can be diminished by treating such waters with certain amide-containing polymer.

15 Claims, No Drawings

STABILIZATION OF MANGANESE IN AQUEOUS SYSTEMS

This is a continuation of copending application(s) Ser. No. 07/156,555 filed on 10/12/88 now abandoned.

Technical Field of the Invention

The present invention is in the technical field of water treatment, and in particular the field of treating water to stabilize manganese therein so as to reduce or eliminate manganese deposits and in some instances avoid depleting manganese from corrosion inhibition treatments.

Background of the Invention

In aqueous systems, particularly industrial aqueous systems such as cooling water systems, boiler systems, and the like, it is undesirable to have contaminant deposits accumulating on the internal surfaces of the equipment and pipes and the like. Such deposits may interfere with water flow, accelerate corrosion of metal parts and surfaces, reduce heat transfer, and lead to other problems. Among the undesirable deposits that may form and accumulate in aqueous systems are deposits of insoluble manganese compounds that are derived from soluble manganese in the water of the system.

Soluble manganese may be introduced into an aqueous system in a number of ways, including its presence in the feed or makeup water or by addition to the system as a component of a corrosion inhibition treatment. Where the soluble manganese is a component of a corrosion inhibition treatment, loss of such manganese by its conversion to insoluble manganese compounds depletes the soluble manganese available for corrosion inhibition treatment activity.

Soluble manganese is generally believed to be manganese in the form of its manganous ion, which is in its second oxidation state, as $Mn^{+2}$, generally referred to as "manganese (II)" or "Mn (II)". Stabilized manganese, as this term is used herein, includes such soluble manganese and any other form(s) of manganese that may be dissolved or soluble in a given water system, and such forms of manganese, and such manganese compounds, that do not settle out from a water system although such species may be removed from the system by filtration, for instance filtration with a 0.1 micron pore-size filter.

In aqueous systems containing soluble manganese the formation of manganese deposits and the loss of manganese, including soluble manganese, to the system is often the result of the soluble manganese encountering a more oxidative environment. For instance, a typical source water for industrial aqueous systems has a pH of less than 7. When brought into an aqueous system such source water may undergo an increase in pH, such as by being admixed with water having a higher pH or by being subjected to a water treatment(s) that increases the pH. At least some oxygen is generally present in such water, and where the pH is increased to greater than 7.0, and more typically to 8.0 or higher, oxygen being present, the precipitation of insoluble manganese compounds, derived from the soluble manganese present, is a common phenomenon. Halogenation processes, such as chlorination processes, are often used in aqueous systems to control microbiological growth. In the presence of halogen species in water, soluble manganese is generally oxidized to insoluble higher-oxidation state species, for instance $MnO_2$. The formation of insoluble manganese species by in situ conversion from the soluble manganese thus often occurs when its aqueous environment becomes more oxidative due to "oxidation by air" (increase in pH in the presence of some oxygen) or the introduction of other oxidizing agents, such as halogens and the like.

It is believed that the most commonly formed insoluble species of manganese are manganese oxide, $MnO_2$, and manganese hydroxide, $Mn(OH)_2$, but in the field of the present invention, and for the purposes of the present invention, the relative proportions of the insoluble or precipitate manganese species between manganese oxide and manganese hydroxide, or the presence, in part or in whole, of other manganese species, is not important. Hence the insoluble or precipitate manganese species, regardless of composition, will at times be referred to hereinafter as manganese hydr(oxide) because a mixture of oxides and hydroxides, including any and all hydrated forms thereof, is a commonly encountered form of such insoluble or precipitate manganese.

It is an object of the present invention to provide a process that stabilizes manganese in water systems, particularly industrial water systems, by reducing or eliminating deposits of insoluble manganese species that would otherwise form when the oxidative nature of the environment is increased. It is an object of the present invention to provide such a process that is applicable to diverse types of oxidizing conditions. It is an object of the present invention to provide such a process that does not interfere with other water treatments, for instance scale inhibition treatment. These and other objects of the invention are described in more detail below.

Disclosure of the Invention

The present invention provides a process for the stabilization of manganese in aqueous systems containing soluble manganese to diminish or eliminate the formation of insoluble or precipitate manganese species when oxidative condition(s) are encountered, which process is comprised of the addition to such aqueous system, preferably before any oxidative condition is encountered or introduced, of a certain agent, described below, effective to stabilize the manganese. The process of the present invention is applicable to, and effective in, the presence of diverse oxidizing environments, and hence instead of being limited to a specific mechanism, for instance suppression of oxidation, inhibition of incipient precipitate, solubilization, dispersancy of precipitate, and the like, this advantage may be the result of the agent's activity in a plurality of such mechanisms. The above-mentioned agent employed in the present invention is a water-soluble polymer having pendant functionality having the chemical formula of Formula I:

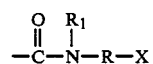

Formula I wherein $R_1$ is hydrogen or alkyl, wherein R is alkylene having 1 to 3 carbon atoms or phenylene, X is sulfonate, and the alkylene or phenylene may be further substituted with (poly)hydroxy; and mixtures thereof.

Preferred Embodiments of the Invention

In preferred embodiment the pendant amide functionality is within monomer units of the polymer having the chemical formula of Formula II:

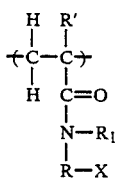

Formula II wherein R' is hydrogen or methyl, and R, R₁, and X are as defined above for Formula I.

In preferred embodiment such amide-containing polymer is a polymer substantially derived from ethylenically unsaturated amide-containing and carboxylate-containing monomers, and as to the amide functionality, in whole or in part N-substituted, instead of employing such an N-substituted monomer(s), the polymer preferably is prepared by post-polymerization derivatization wherein some or all of a unsubstituted amide functionality is converted to N-substituted amide functionality within Formulas I or II above.

The polymer employed in the present invention in preferred embodiment may be one containing monomer units of sulfomethylacrylamide, sulfomethylmethacrylamide, sulfoethylacrylamide, sulfoethylmethacrylamide, sulfopropylacrylamide, sulfopropylmethacrylamide, hydroxysulfoethylacrylamide, hydroxysulfoethylmethacrylamide, hydroxysulfopropylacrylamide, hydroxysulfopropylmethacrylamide, sulfophenylacrylamide, sulfophenylmethacrylamide, hydroxysulfophenylacrylamide, and hydroxysulfophenylmethacrylamide, it being understood that herein where the unit as designated includes isomers, such as the various isomers of hydroxypropylacrylamide, all reasonable isomers are included in the above.

In more preferred embodiment the polymer employed in the present invention is one containing units of sulfomethylacrylamide, 2-sulfoethylacrylamide, and mixtures thereof, particularly with units of acrylamide and one or more of such N-substituted acrylamide units.

The polymer employed in the present invention in preferred embodiment also contains units derived from acrylic acid as the carboxylate-containing monomer, although such carboxylate functionality may be derived from other carboxylate-containing monomers such as maleic anhydride or acid, itaconic acid, methacrylic acid, and the like. The term carboxylate as used herein includes the acid form and its alkali metal and ammonium salts.

The polymer employed in the present invention may be substantially a copolymer of pendant amide functionality units within Formulas I and II above together with pendant carboxylate-containing units, or in other embodiment it may be substantially a terpolymer that contains both unsubstituted amide functionality and N-substituted amide functionality together with carboxylate functionality. In more preferred embodiment the polymer employed in the present invention has a mole ratio of from 5 to 90 moles of the amide functionality-containing units of Formula II to 10 to 95 moles of other units. In further preferred embodiment, such polymer has a molecular weight of from 5,000 to 100,000. In further preferred embodiment the polymer employed in the present invention has a mole ratio of from 5 to 50 moles of the amide functionality-containing units of Formula II to 50 to 95 moles of other units, which other units preferably are substantially carboxylate-containing units and unsubstituted pendant amide-containing units. In further preferred embodiment the polymer employed in the present invention is a terpolymer having from 5 to 50 mole percent of units of the Formula II, from 10 to 60 mole percent of acrylamide units, and from 20 to 80 mole percent of acrylic acid units, provided of course that for the various units the mole percentages are selected so as to equal 100 when combined. In another preferred embodiment, the polymer employed in the present invention has from 5 to 30 mole percent of units of the Formula II, and in more preferred embodiment such a polymer is a terpolymer further including from 20 to 60 mole percent of acrylamide units and from 35 to 75 mole percent of acrylic acid units. In another preferred embodiment, the polymer employed in the present invention has a molecular weight of from 5,000 to 50,000.

In further preferred embodiment the polymer employed in the present invention is an acrylic acid/(meth)acrylamide copolymer, an acrylic acid/sulfomethylacrylamide copolymer, an acrylic acid/acrylamide/sulfomethylacrylamide terpolymer, an acrylic acid/sulfoethylacrylamide copolymer, an acrylic acid/acrylamide/sulfoethylacrylamide terpolymer, and the latter two polymers wherein the sulfoethylacrylamide units are 2-sulfoethylacrylamide. In more preferred embodiment the polymer is substantially one of these copolymers or one of these terpolymers, and has a molecular weight of from 5,000 to 100,000, and more preferably from 5,000 to 50,000, and even more preferably from 10,000 to 40,000.

The polymeric compositions having N-substituted amide functionality used in the present invention may be prepared by the molecular modification of a preexisting polymer chain of suitable length so as to incorporate the N-substituent, particularly when the N-substituent contains sulfonate, as distinguished from attempts to build up a sufficiently large polymer from sulfonated monomers. A method for such post-polymerization derivatization is disclosed in U.S. Pat. No. 4,604,431 (Fong et al.), the disclosures of which are hereby incorporated hereinto by reference. Other methods may of course be used to prepare the polymers of the present invention.

The aqueous system in which the present process may be employed may be any aqueous system, regardless of whether the water therein is generally flowing or static, but in preferred embodiment the aqueous system is an industrial aqueous system, such as cooling water systems, water distribution systems, boiler water systems, and the like, wherein it is desirable to avoid the accumulation of deposits on surfaces in contact with the water, and/or wherein soluble manganese is desired to be retained available as a corrosion treatment component or for some other reason, and wherein the water of the system that contains soluble manganese is, or may be, subject to oxidizing condition(s) that otherwise would lead to the precipitation of insoluble manganese species or manganese (hydr)oxide.

Although the present invention is not limited in its broadest embodiments to the type of oxiding condition the water is subject to, the present invention has been found extremely advantageous and effective in stabilizing manganese to the effects of air oxidation and halogenation conditions, which conditions are described above, and such advantages are demonstrated below in the various Examples and comparative examples.

The degree of stabilization provided by the process of the present invention may depend upon the level of manganese present in the water being treated, the level of polymer of the present process being used in the process, the degree of the oxidizing condition encountered, and other variables, and further the degree of stabilization desired or deemed reasonable may vary. An effective amount of the polymer of the present process may reasonably vary in typical aqueous systems, including typical industrial aqueous systems, from about 0.1 to 50 ppm concentration of such polymer in the water and preferably from about 1.0 to about 25 ppm. An effective amount of the polymer of the present process may also be defined in terms of the level of manganese present in the aqueous system, and in such terms an effective amount is from about 0.1 to 20.0 ppm of polymer for each ppm of soluble manganese and preferably from 0.5 to 10.0 ppm of polymer for each ppm of soluble manganese.

As used herein, the term "halogen species" refers to those forms of halogen as they exist in aqueous systems, including, but not limited to, hypohalous acids (HOBr, HOCl) and hypohalite salts ($M(OCl)_n$, $M(OBr)_n$, where M=Na, Ca, K, Li, and n=1,2) as they exist in equilibrium. Such species may result from the introduction of halogen in any of several forms, including, but not limited to, gaseous chlorine, sodium hypochlorite solutions (bleach), inorganic bromide salts in contact with chlorine-containing oxidants, or solid calcium hypochlorite.

As used herein, the term stabilized as used with respect to the stabilization of manganese means in its broadest sense that with a stabilization treatment at least a portion of the manganese present in the water treated does not settle out after being subjected to an oxidizing condition, particularly in comparison to the amount that settles out under the same conditions but without any stabilization treatment. In a narrower sense the manganese stabilized is that which remains in the water's filtrate after filtration, for instance through a 0.1 or 0.45 micron pore size filter, and it is believed that this narrower sense of the term stabilization may be applicable only where at least part of the purpose of stabilizing the manganese is to keep soluble manganese available as a component of a corrosion inhibition treatment or other like purpose. For purposes of reducing the accumulation of manganese deposits, it is the total manganese stabilized that is important, which total manganese includes all the manganese that does not settle out, and is not limited to that portion thereof that would remain in the filtrate upon filtration.

In the following Examples and comparative examples the method employed to determine the amount of manganese stabilized is atomic absorption analysis of either the top portion of a sample that has been allowed to sit for a time period during which the amount that settles out has fallen to the bottom of the sample, or the filtrate of a sample that has been subjected to filtration as indicated therein.

As discussed herein, the stabilization, not being limited in its broadest sense to any mechanism whereby at least a portion of the manganese does not settle out of the aqueous system, the manganese so stabilized is not necessarily in whole or part in the form of Mn(II). This does not exclude the belief that in at least some embodiments of the invention the soluble manganese is not oxidized and remains in the aqueous system as Mn(II) by virtue of the process of the present invention. Hence the form of the stabilized manganese may be in whole or part, but need not be, the Mn(II) ion.

The efficacy of the process of the present invention is further described and demonstrated in the following working Examples and comparative examples.

Set forth in Table A below are the abbreviations used herein to identify the various monomer segments of the polymers discussed.

TABLE A

| Abbreviation | Monomer Unit |
|---|---|
| AA | Acrylic acid |
| Am | Acrylamide |
| AMS | Sulfomethylacrylamide |
| 2-AES | 2-sulfoethylacrylamide |
| HAPS | 2-hydroxy-3-sulfopropylacrylamide |
| APS | Sulfophenylacrylamide |
| AOHPS | Allyloxy hydroxy propane sulfonic acid |
| MaA | Maleic acid or anhydride |
| SS | Sulfonated styrene |
| MA | Methylacrylate |
| AMPS | 2-acrylamido-2-methylpropylsulfonic acid |
| tBuAm | t-butylacrylamide |
| 2-HPA | 2-hydroxypropylacrylate |

Example 1

A test and comparative tests were performed to simulate and determine the effectiveness of the present process in stabilizing manganese hydr(oxide) under conditions often present in industrial aqueous systems, such as cooling towers. Aqueous test solutions were prepared containing 2 ppm of soluble manganese, plus 10 ppm soluble iron ($Fe^{+2}$), a typical level of calcium and magnesium ions, and 10 ppm of polymer. In addition to one test solution containing a polymer of the present process, various other polymers of the type used for commercial water treatment were tested as comparative examples. These test solutions, as prepared, have a pH of less than 7.0. The solutions were then each treated to raise the pH above 7.5, heated with stirring for a certain time period, and then allowed to stand at room temperature for a certain time period. Unfiltered samples were then taken from the top portion of each solution and these samples were analyzed by atomic absorption analysis for both manganese and iron content. The higher the manganese content in such samples the higher was the stabilization activity of the polymer tested; for instance a level of 2 ppm manganese would have been a 100 percent stabilization rating. A percent stabilization rating was also determined for the iron, based upon 10 ppm iron being a 100 percent rating. The results were reported in percent stabilization. All solutions were processed in an identical manner, including the pH to which they were raised, the agent used to adjust the pH, the temperature and duration of the heating period, the length of time the solution was allowed to stand at room temperature until sampled, and the portion of the solution which was taken as a sample for analysis. The test results and identities of the polymers tested are set forth below in Table I. The polymers are identified in terms of monomer units, mole ratios thereof, and molecular weights. In addition to the solutions treated with various polymers, one solution was processed in precisely the same manner without any polymer added as a "blank".

TABLE I

| Example or Comparative[1] Example | Polymer Composition | | | Stabilization Percentages | |
|---|---|---|---|---|---|
| | Monomers | Mole Ratios | Molecular Wt. | Mn | Fe |
| Blank | — | — | — | 0 | 0 |
| Example 1 | AA/Am/AMS | 57/27/17 | 17,300 | 92 | 95 |
| Com. Ex. a | AA/HPA | 67/33 to 75/25 | 7,400 | 3 | 0 |
| Com. Ex. b | AA | 100 | 4,400 | 5 | 2 |
| Com. Ex. c | AA/AOHPS | 86/14 | 157,000 | 1 | 0 |
| Com. Ex. d | AA/MA | 83/17 | 5,800 | 23 | 19 |
| Com. Ex. e | MaA/SS | 25/75 | 19,000 | 88 | 89 |

[1] The abbreviation "Com." or "com." as used in this and subsequent tables means "comparative".

Example 2 to 5

The test described in Example 1 above was repeated except that the polymers (both examples and comparative examples) were tested at a level of 8 and 9 ppm in addition to 10 ppm. The polymer identities and test results are set forth below in Table II.

TABLE II

| | | | | Stabilization percentages | | | | | |
|---|---|---|---|---|---|---|---|---|---|
| | | | | 8 ppm | | 9 ppm | | 10 ppm | |
| Example | Monomers | Mole Ratios | Molecular Wt. | Mn | Fe | Mn | Fe | Mn | Fe |
| 2 | AA/Am/HAPS | 50/30/20 | 18,200 | 14 | 11 | 45 | 46 | 94 | 95 |
| 3 | AA/Am/2-AES | 55/27/18 | 15,700 | 97 | 100 | 96 | 100 | 96 | 100 |
| 4 | AA/Am/4-APS | 45/45/10 | 11,500 | 51 | 59 | 94 | 89 | 97 | 90 |
| 5 | AA/Am/AMS | 60/25/15 | 16,400 | 93 | 100 | 98 | 95 | 97 | 100 |
| Com. Ex. "f" | AA/AMPS | 70/30 | 12,300 | 16 | 10 | 36 | 29 | 87 | 82 |

Examples 6 and 7

The test described in Example 1 above was repeated with the following modifications. No iron was included in the test solution. The time period of standing at room temperature after the heating period was doubled. Then in addition to taking an unfiltered sample for analysis from the top portion of the solutions, another sample from each was first filtered through a 0.1 micron Millipore filter (mixed cellulose acetate/nitrate), and the filtrate was analyzed also by atomic absorption for manganese. In addition to percentage of stabilization of manganese, determined by manganese concentration, for unfiltered and filtered samples, the appearance of the samples were reported. Oxidation-state stabilization, i.e., maintenance of the initial oxidation state in the presence of oxidation condition(s), is believed visually manifested by colorless solutions, as compared to the dark brown color seen in a blank that had no stabilization treatment. In addition to polymers within the present invention, various other polymers were tested as comparative examples. All polymers were tested at a level of 10 ppm. The polymer identities and test results are set forth below in Table III.

With respect to Examples 6 and 7 above, to determine generally the efficiency of the 0.1 micron Millipore filter used in comparison to a 0.025 micron Millipore filter in such tests, a similar sample was analyzed after both filtering through a 0.1 micron filter and through a 0.025 micron filter, and the manganese analyses were comparable.

The preceding Examples 1 to 7 and various comparative examples demonstrated the efficacy of the process of the present invention under typical industrial water conditions in the presence of oxidative conditions of the type referred to herein as oxidation by air. The process of the present invention is also effective in the presence of a chemical oxidant, such as a halogen, as demonstrated in the following Examples 8 and 9 which further are directed to determining the amount of manganese kept in a solubilized state so as not to be removed from the upper portion of the samples after such upper portion has been filtered through a 0.45 micron Millipore Type HA filter.

Example 8

The efficacy of the process of the present invention in stabilizing manganese in the presence of halogen species in water was determined in the laboratory in the following manner. Synthetic cooling water containing 2 ppm Mn(II) and typical levels of hardness and alkalinity was prepared. The pH was raised above 7.5 by the addition of dilute NaOH. To inhibit CaCO3 precipitation from the samples, 1-phosphonobutane-1,2,4-tricarboxylic acid (PBTC) was included in the synthetic cooling

TABLE III

| Example or Comparative Example | Polymer Composition | | | Manganese (2 ppm) Stabilization Percentages | |
|---|---|---|---|---|---|
| | Monomers | Mole Ratios | Molecular Wt. | unfiltered | filtered |
| blank | — | — | — | 0 | 0 |
| 6 | AA/Am/AMS | 57/27/17 | 17,300 | 94 | 52 |
| 7 | AA/Am/AMS | 60/25/15 | 16,400 | 99 | 69 |
| Com. Ex. g | AA/HPA | 67/33 to 75/25 | 5,500 | 100 | 82 |
| Com. Ex. h | AA | 100 | 4,400 | 94 | 85 |
| Com. Ex. i | MaA/SS | 25/75 | 19,000 | 96 | 27 |
| Com. Ex. j | AA/AOHPS | 86/14 | 23,400 | 84 | 82 | water. Aliquots of this solution were dispensed into amber bottles. Various polymers, as an example and comparative examples, were added, followed by the introduction of NaOCl. The samples were capped and stored at ambient room temperature for 40 hours, after which the aliquots were each filtered through 0.45 micron Millipore Type HA filters. The filtrates were analyzed by atomic absorption to determine the concentration of manganese in each. The test results are expressed in Table IV below as concentration of manganese (ppm) in such filtrates. The dosage of NaOCl was 6 ppm (as $Cl_2$) and the dosage of all polymers tested was 10 ppm based on actives.

TABLE IV

| Example or comp. Example | Polymer Composition | | | Stabilized Mn (ppm) |
| --- | --- | --- | --- | --- |
| | Monomers | Mole Ratio | M. Wt. | |
| 8 | AA/Am/AMS | 57/27/17 | 17,300 | 1.40 |
| Com. k | AA/HPA | 2/1 to 3/1 | 7,400 | 0.47 |
| Com. l | AA | 100 | 2600–4400 | 0.10 |
| Com. m | MaA/SS | 25/75 | 19,000 | 0.20 |
| Com. n | AA/MA | 83/17 | 5,800 | 0.30 |
| Com. o | AA/MaA/tBuAm | 68/19/13 | — | 0.30 |
| blank | — | — | — | 0.00 |
| Standard w/o OCl− | — | — | — | 1.80 |

Example 9

Successive samples from Example 8's aliquot were filtered through various pore-size filters and then analyzed by atomic absorption for manganese to determine the difference, if any, by virtue of the filter used for this AA/Am/AMS treated aliquot. The results of this evaluation are set forth below in Table V.

TABLE V

| Filter Pore Size (microns) | Manganese (ppm) |
| --- | --- |
| 0.45 | 1.40 |
| 0.1 | 1.40 |
| 0.025 | 1.15 |

Industrial Applicability of the Invention

The present invention is applicable to those industries employing process waters in aqueous systems, including cooling towers, industrial boiler systems, and the like.

We claim:

1. A method of stabilizing manganese in the waters of an aqueous system to at least diminish the formation of manganese deposits caused by oxidative condition(s) of said waters which method comprises:

the addition to the waters of said aqueous system an effective amount of a water-soluble terpolymer comprised of from about 20 to about 75 mole percent of acrylic acid units, from about 10 to about 60 mole percent a acrylamide units, and from about 5 to about 70 mole percent of N-substituted acrylamide units having pendant amide functionality of the Formula I:

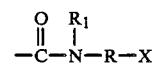

wherein $R_1$ is hydrogen, X is sulfonate, and R is alkylene having 1 to 3 carbon atoms or phenyl or mixtures thereof, and wherein said water-soluble terpolymer has a molecular weight of from about 5,000 to about 50,000.

2. The method of claim 1 wherein said water-soluble polymer is added to said waters before said oxidative condition(s) are encountered or introduced.

3. The method of claim 1 wherein said monomer units of Formula I are units of sulfomethylacrylamide, 2-sulfoethylacrylamide, or mixtures thereof.

4. The method of claim 1 wherein said water-soluble terpolymer has a mole percentage of from 5 to 50 mole percent of said N-substituted acrylamide units and from 50 to 95 mole percent of said acrylic acid and acrylamide units.

5. The method of claim 1 wherein said water-soluble terpolymer has from 5 to 30 mole percent of said N-substituted acrylamide units.

6. The method of claim 5 wherein said water-soluble polymer is a terpolymer further 9 including from 20 to 60 mole percent of acrylamide units and from 35 to 75 mole percent of acrylic acid units.

7. The method of claim 1 wherein said water-soluble terpolymer is an acrylic acid/acrylamide/sulfomethlacrylamide terpolymer.

8. The method of claim 1 wherein said water-soluble terpolymer is an acrylic acid/acrylamide/2-sulfoethylacrylamide terpolymer.

9. The method of claim 1 wherein said water-soluble terpolymer is an acrylic acid/acrylamide/2-hydroxy-3-sulfopropylacrylamide terpolymer.

10. The method of claim 1 wherein said water-soluble terpolymer is an acrylic acid/acrylamide/sulfophenylacrylamide terpolymer.

11. The method of claim 1 wherein said aqueous system is an industrial aqueous system.

12. The method of claim 1 wherein said effective amount of said water-soluble terpolymer is from 0.1 to 50 ppm concentration of said terpolymer in said waters.

13. The method of claim 12 wherein said effective amount of said water-soluble terpolymer is from 1.0 to 25 ppm concentration of said terpolymer in said waters.

14. The method of claim 1 wherein said effective amount of said water-soluble terpolymer is from 0.1 to 20 ppm of said terpolymer for each ppm of soluble manganese present in said waters.

15. The method of claim 14 wherein said effective amount of said water-soluble terpolymer is from 0.5 to 10.0 ppm of said terpolymer for each ppm of soluble manganese present in said waters.

* * * * *

UNITED STATES PATENT AND TRADEMARK OFFICE
CERTIFICATE OF CORRECTION

PATENT NO. : 4,963,267

DATED : Oct. 16, 1990

INVENTOR(S) : John E. Hoots, Kenneth P. Fivizzani, Barbara E. Fair

It is certified that error appears in the above-identified patent and that said Letters Patent is hereby corrected as shown below:

On the first page, left-hand column, line identified as "(63)", delete "1980" and substitute therefor -- 1988 --.

In Column 6, line 29, delete " ,the " and substitute therefor -- the -- .

In Claim 1, column 9, line 59, after "percent" delete " a ".

In Claim 6, column 10, line 29, after "further" delete "9".

Signed and Sealed this

Fourteenth Day of January, 1992

Attest:

HARRY F. MANBECK, JR.

*Attesting Officer*  *Commissioner of Patents and Trademarks*